(12) United States Patent
Manduzio et al.

(10) Patent No.: US 9,469,226 B2
(45) Date of Patent: Oct. 18, 2016

(54) FASTENING ARRANGEMENT, HEADREST AND ASSEMBLY METHOD

(71) Applicant: JOHNSON CONTROLS GMBH, Burscheid (DE)

(72) Inventors: Felix Manduzio, Strasbourg (FR); Christophe Morinière, Holtzheim (FR)

(73) Assignee: JOHNSON CONTROLS GMBH, Burscheid (DE)

( * ) Notice: Subject to any disclaimer, the term of this patent is extended or adjusted under 35 U.S.C. 154(b) by 9 days.

(21) Appl. No.: 14/410,795

(22) PCT Filed: Jun. 20, 2013

(86) PCT No.: PCT/EP2013/062917
§ 371 (c)(1),
(2) Date: Dec. 23, 2014

(87) PCT Pub. No.: WO2014/001199
PCT Pub. Date: Jan. 3, 2004

(65) Prior Publication Data
US 2015/0367763 A1 Dec. 24, 2015

(30) Foreign Application Priority Data
Jun. 27, 2012 (DE) .................. 10 2012 012 684

(51) Int. Cl.
*A47C 1/10* (2006.01)
*B60N 2/48* (2006.01)

(52) U.S. Cl.
CPC ............ *B60N 2/48* (2013.01); *Y10T 29/49828* (2015.01)

(58) Field of Classification Search
CPC ............ B60N 2/48; B60N 2002/4897; Y10T 29/4928
USPC .................................. 297/391, 463.1, 463.2
See application file for complete search history.

(56) References Cited

U.S. PATENT DOCUMENTS

| | | | | |
|---|---|---|---|---|
| 5,257,853 A * | 11/1993 | Elton | ................... | B60N 2/4808 297/391 |
| 6,183,045 B1 * | 2/2001 | Marfilius | ............. | B60N 2/4802 297/220 |
| 6,412,872 B2 * | 7/2002 | Takeda | ................. | B60N 2/4838 297/391 |
| 6,419,322 B2 * | 7/2002 | Nakane | .................. | B60N 2/485 297/391 |
| 6,634,715 B2 * | 10/2003 | Nakane | .................. | B60N 2/485 297/391 |
| 6,749,257 B2 * | 6/2004 | Muller | ...................... | B60N 2/48 136/251 |
| 7,284,795 B2 * | 10/2007 | Sato | ..................... | B60N 2/4838 297/220 |
| 7,819,480 B2 * | 10/2010 | Asbury | .................... | A47C 7/38 297/391 |
| 8,398,173 B2 * | 3/2013 | Morilhat | ................ | B60N 2/485 297/220 |
| 8,573,701 B2 * | 11/2013 | Yetukuri | .................. | B60N 2/48 297/216.12 |
| 2013/0106162 A1 * | 5/2013 | Raja K | ................ | B60N 2/4855 297/391 |

FOREIGN PATENT DOCUMENTS

| | | |
|---|---|---|
| DE | 39 26 248 C1 | 1/1991 |
| DE | 101 09 655 A1 | 9/2001 |
| DE | 10 2007 034 496 A1 | 5/2008 |
| DE | 10 2010 049084 A1 | 4/2012 |
| JP | 2001 238 755 A | 9/2001 |

* cited by examiner

*Primary Examiner* — Laurie K Cranmer
(74) *Attorney, Agent, or Firm* — McGlew and Tuttle, P.C.

(57) ABSTRACT

A fastening arrangement (1) for a headrest, in particular for a vehicle seat has a main body (2) which is intended to hold a head-supporting part. The main body can be fixed to a retaining rod (4) by a fastening element (6). The fastening element (6) is integrally connected to the main body.

9 Claims, 1 Drawing Sheet

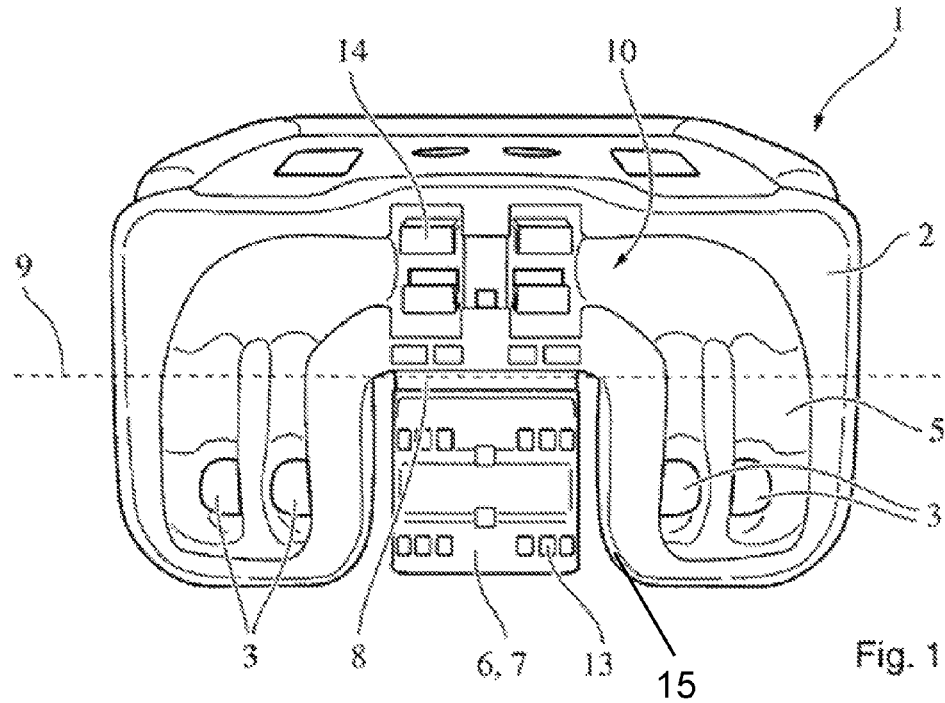
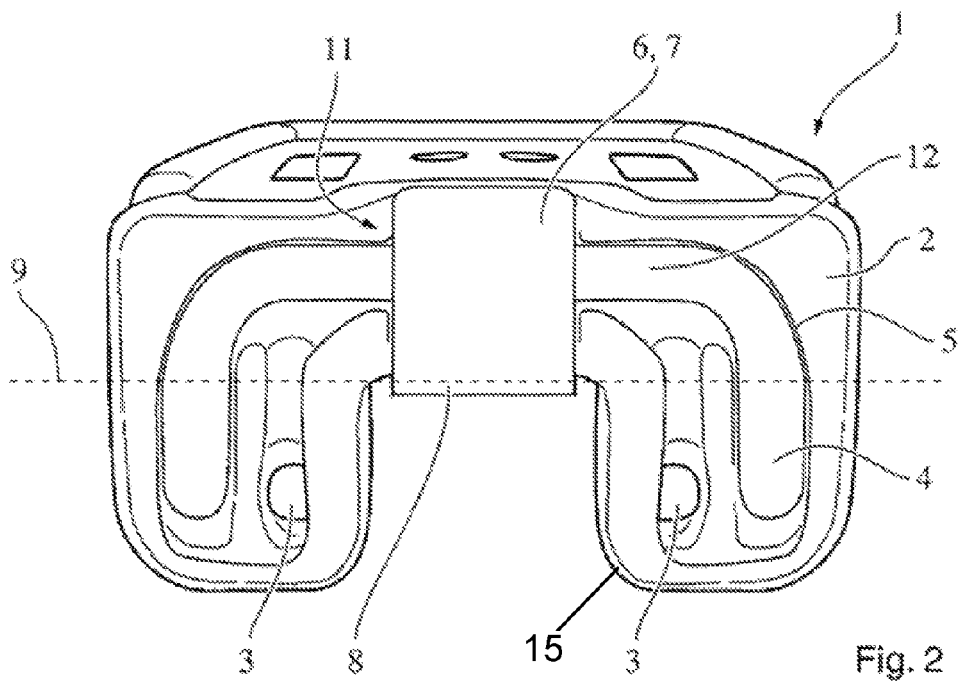

FASTENING ARRANGEMENT, HEADREST AND ASSEMBLY METHOD

CROSS REFERENCE TO RELATED APPLICATIONS

This application is a U.S. National Phase Application of International Application PCT/EP2013/062917 filed Jun. 20, 2013 and claims the benefit of priority under 35 U.S.C. §119 of German Patent Application DE 10 2012 012 648.0 filed Jun. 27, 2012, the entire contents of which are incorporated herein by reference.

FIELD OF THE INVENTION

The present invention relates to a fastening arrangement for a headrest, in particular for a vehicle seat, wherein fastening arrangement has a base body, provided for supporting a head contact part, wherein the base body is attachable to a support rod by means of a fastening element. Such fastening arrangements are well-known.

BACKGROUND OF THE INVENTION

By way of example, document DE 10 2007 034 496 A1 discloses a headrest with a shell acting as a head contact part which is movably mounted on a bracket-shaped support rod. A plate acting as a base body is further fixed on a horizontal section of the support rod.

A disadvantage of the known fastening arrangements is that the assembly of the base body to the support rod is always comparatively complex and thus cost-intensive. In addition, fastening methods are often used in which the base body is fastened by several individual items, and in particular locking pins, to the support rod. Such fastening methods have the disadvantage that the base body is not secured when a mistake is made in the assembly and by way of example; the locking pins are inadvertently not assembled. The headrest is not reliably locked in this case, whereby serious risk of injury to the vehicle occupants arises in case of an accident.

SUMMARY OF THE INVENTION

It is an object of the present invention to make available a fastening arrangement which allows for easier and faster assembly using fewer parts, so that the risk of incorrect installation is reduced.

This object is achieved by a fastening arrangement for a headrest, especially for a vehicle seat, wherein the fastening arrangement comprises a base body, which is provided for supporting a head contact part, wherein the base body is attached to a support rod by means of a fastening element and wherein the fastening element is integrally connected to the base body.

The device according to the invention has the advantage over the prior state of the art that the fastening element is integrally connected to the base body, so that the risk of accidentally "forgetting" the fastening element during the assembly of the fastening arrangement is reduced. In addition, the assembly is considerably simplified, since no additional assembly step to provide the fastening element is necessary, as the fastening element is immediately ready for assembly and is pre-positioned correctly. Moreover, production costs are reduced because there is no need to manufacture separate fastening elements. In particular, the support rod includes a retaining bracket, whose ends are placed inside the guide supports of a backrest. A padded head contact part is preferably attached to the base body. It is conceivable that the head contact part is attached to the base body in an adjustable and lockable manner relative to the base body to implement a longitudinal, vertical and/or angle adjustment mechanism for the headrest. Alternatively, the head contact part is rigidly coupled to the base body to make available a headrest without additional adjustment possibilities.

According to a preferred embodiment of the present invention it is provided that the fastening element comprises a mounting bracket pivotable around a pivot axis relative to the base body, wherein the said mounting bracket, is pivotable in particular in a released state in which the base body and the support rod are pre-positioned relative to each other, and a locked state in which the base body and the support rod are fixed by the mounting bracket to each other. In an advantageous manner, the mounting bracket must be pivoted around the pivot axis during the assembly of the fastening arrangement. On the one hand, the assembly process is thus significantly simplified and accelerated, and on the other hand it is immediately apparent when a fastening assembly is not arranged correctly in a safety-relevant manner, since in this case the mounting bracket is still in the released state. The pivot axis of the mounting bracket is located preferably parallel to a horizontal portion of the support rod. The mounting bracket is preferably attached pivotally via a film hinge to the base body, wherein the base body, the film hinge and the mounting bracket are manufactured integrally in one piece from the same plastic material. In an advantageous manner, the fastening arrangement can thus be manufactured in plastic in a comparatively inexpensive manner.

According to a preferred embodiment of the present invention it is provided that the mounting bracket comprises at least one locking element and the base body at least one counter-locking element, the locking element and the counter-locking element being locked to one another in the locked state. In an advantageous manner, the mounting bracket is fixed by locking the locking element to the counter-locking element in the locked state, so that accidental opening of the mounting bracket, in particular an unwanted return from the locked state into the released state is prevented. It is conceivable that the mounting bracket in the locked state is not disposed on one side of the retaining bracket, oriented in the main stress direction to be expected by way of example in case of accident. The mounting bracket is therefore arranged by way of example along the direction of travel (x direction) not in front of or behind the mounting bracket, but rather in a vertical direction (z-direction) above or below the retaining bracket. The locking element is preferably formed integrally in one piece with the mounting bracket and the counter-locking element formed integrally in one piece with the base body. The locking and counter-locking elements preferably comprise mutually interlocking and/or force-fitted engaging locking lugs.

According to a preferred embodiment of the present invention it is provided that the base body has at least one through-opening for receiving the support rod, wherein the support rod, in particular the support rod in the released state can be inserted into the through opening and attached by means of the mounting bracket to the through-opening in the locked state. In an advantageous manner, the base body is attached in an interlocking manner through the wall of the through-opening perpendicularly relative to the axial direction of the forces acting through the through-opening.

According to a preferred embodiment of the present invention, it is provided that the base body has at least one indentation, which is provided for the interlocking reception of at least a portion of the support rod, wherein in particular the support rod can be arranged in the indentation in the released state and attached by means of the mounting bracket to the recess in the locked state. In an advantageous manner, the support rod is at least partially attached in an interlocking manner to the indentation so that the acceleration forces acting on the base body are transmitted directly to the support rod. The shape of the indentation is preferably adapted for this purpose to the outer shape of the support rod. Preferably, the base body has at least two differently designed indentations that are provided for the interlocking reception of a respective portion of two differently designed and modularly interchangeable support rods. In an advantageous manner, the same base body can thus be used for different geometries of the support rods, and thus, by way of example, for different types of vehicle seats.

According to a preferred embodiment of the present invention it is provided that in the locked state a horizontal section of the mounting bracket is locked in an interlocking and/or force-fitted manner between the support rod and the base body. In an advantageous manner, thus a simplified attachment of the fastening arrangement is made possible because the retaining bracket only needs to be inserted from the top (in the Z direction) into the through-opening until the horizontal portion is arranged in the indentation. Subsequently, the mounting bracket is pivoted from the released state over the horizontal section into the locked state and locked in position there.

A further object of the present invention is a headrest comprising the assembly arrangement according to the invention, wherein the headrest has a head contact part and a support rod designed as a retaining bracket, wherein the head contact part is attached rigidly or movably to the base body and the base body is attached fixedly to the retaining bracket by means of the fastening element.

A further object of the present invention is also a method for assembling a fastening arrangement for a head rest, wherein in a first assembly step, a base body and a support rod are prepositioned relative to each other and wherein in a second assembly step, the base body and the support rod attached relatively to each other are characterized in that in the second assembly step, a mounting bracket is pivoted around a pivot axis from a released state to a locked state. In an advantageous manner, production time is shortened due to the simplified assembly procedure and thus the manufacturing costs of the fastening arrangement are reduced. Preferably, in the first assembly step, the support rod is pushed into a through-opening of the base body and/or at least a part of the support rod is arranged in an indentation of the base body, wherein the mounting bracket in the first assembly step remains in the released state.

Further details, features and advantages of the invention become apparent from the drawings as well as from the following description of preferred embodiments supported by the drawings. The drawings merely illustrate exemplary embodiments of the invention which do not limit the essential inventive concept.

The present invention shall be explained in more detail on the basis of the following figures and exemplary embodiments, without the present invention being limited to these. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic view of a base body of a fastening arrangement according to an exemplary embodiment of the present invention; and FIG. 2 is a schematic view of a base body fastened to a support rod of the fastening arrangement according to the exemplary embodiment of the present invention.

DESCRIPTION OF THE PREFERRED EMBODIMENTS

In the various figures, the same parts are always provided with the same references and are therefore usually also named or mentioned only once.

In FIG. 1 a schematic view of a base body 2 of a fastening assembly 1 is shown according to an exemplary embodiment of the present invention. The base body 2 has through openings 3, into which a support rod 4 formed by retaining brackets can be inserted (see FIG. 2). The base body 2 is further provided with an indentation 5, whose shape corresponds to an outer shape of a portion of support rod 4.

The attachment arrangement 1 further has a fastening element 6, which is designed in the form of a mounting bracket 7. Mounting bracket 7 is pivotably connected by means of a film hinge 8 around a pivot axis 9 to base body 2.

Mounting bracket 7 is provided with a plurality of locking elements 13 for the purpose of interlocking them with the counter-locking elements 14 provided in base body 2. In the present example, locking elements 13 are formed as locking hooks, which interlock with counter-locking lug elements 14.

Base body 2, film hinge 8 and mounting bracket 7 are designed as a one-piece plastic component, by way of example as an injection mold or thermoforming mold component.

Due to film hinge 8, mounting bracket 7 can be pivoted around pivot axis 9 between a released position 10 (see FIG. 1) and a locked position 11 (see FIG. 2). In the released position 10, mounting bracket 7 is separated from base body 2 and indentation 5 is freely accessible. In the locked position 11, mounting bracket 7 is pivoted in the direction of base body 2 towards indentation 5, so that an horizontal section 12 of support rod 4 located in indentation 5 within the area of mounting bracket 7 is held in an interlocking manner between the wall of indentation 6 and mounting bracket 7, and in particular clamped in a force-fitted manner (See FIG. 2). In the present example, fastening assembly 1 comprises a plurality of through-openings 3 and in the present example indentation 5 has two different shapes, so that basic body 2 can be used with different types of modular support rods 4.

For the assembly of main body 2 to support rod 4, support rod 4 is threaded through through-openings 3, until horizontal portion 12 is received in an interlocking manner by indentation 5. Subsequently, mounting bracket 7 is pivoted from the released position 10 to the locked position.

In FIG. 2 a schematic view of a base body 2 is shown together with a support rod 4 fixed to base body 2. Mounting bracket 7 is transferred into locked position 11, so that horizontal section 12 is fixed between mounting bracket 7 and the wall of the indentation 5. Interlocking of the locking elements 13 with counter-locking elements 14 ensures that mounting bracket 7 is fixed in locked position 11, and accidental opening of mounting bracket 7 is prevented. It is conceivable that counter-locking elements 14 also have a further undercut for interlocking with support rod 4.

The free ends of the retaining bracket can be inserted in particular into corresponding guides of a backrest of a vehicle seat. The retaining bracket is especially a multiple bent metal tube. A padded head contact part 15 is further to be attached in a fixed or adjustable manner to base body 2.

While specific embodiments of the invention have been shown and described in detail to illustrate the application of the principles of the invention, it will be understood that the invention may be embodied otherwise without departing from such principles.

The invention claimed is:

1. A fastening arrangement for a headrest for a vehicle seat, the fastening arrangement comprising:
a base body, provided for supporting a head contact part;
a support rod;
a fastening element, wherein the base body is attachable to the support rod by means of the fastening element, wherein the fastening element is integrally connected in one piece with the base body, the fastening element comprising a mounting bracket pivotable around a pivot axis relative to the base body, wherein the mounting bracket is pivotable into a released state, in which the base body and the support rod are prepositioned relative to each other, and into a locked state, in which the base body and the support rod are fixed to each other by the mounting bracket, the base body having at least two differently designed indentations provided for interlocking admission of at least a partial area of the support rod, wherein the support rod can be arranged in the released state in one of the two indentations and in the locked state fixed in said one of the two indentations by the mounting bracket, wherein the support rod is one of two differently designed and modular interchangeable support rods.

2. A fastening arrangement according to claim 1, wherein the mounting bracket comprises at least one locking element and the base body comprises at least one counter-locking element, wherein the locking element and the counter-locking element are interlocked in the locked state.

3. A fastening arrangement according to claim 1, wherein the base body comprises at least one through-opening for receiving the support rod, wherein the support rod is insertable through the through-opening in the released state and fixed inside the through-opening by the mounting bracket in the locked state.

4. A fastening arrangement according to claim 1, wherein in the locked state, a horizontal portion of the support rod is locked in an interlocking and/or force-fitted manner between the mounting bracket and the base body.

5. A fastening arrangement according to claim 4, wherein a pivot axis of the mounting bracket runs parallel to the horizontal portion of the support rod.

6. A fastening arrangement according to claim 1, wherein the mounting bracket is attached by means of a film hinge in a pivotable manner to the base body, wherein the base body, the film hinge and the mounting bracket are made integrally in one piece from plastic material.

7. A headrest comprising:
a fastening arrangement comprising:
a base body;
a support rod;
a fastening element, wherein the base body is attachable to the support rod by means of the fastening element, wherein the fastening element is integrally connected in one piece with the base body; and
a head contact part, wherein the support rod comprises a retaining bracket, wherein the base body is attached to the retaining bracket in a fixed manner by means of the fastening element, the fastening element comprising a mounting bracket pivotable around a pivot axis relative to the base body, wherein the mounting bracket is pivotable into a released state, in which the base body and the support rod are prepositioned relative to each other, and into a locked state, in which the base body and the support rod are fixed to each other by the mounting bracket, the base body having at least one indentation provided for interlocking admission of at least a partial area of the support rod, wherein the support rod can be arranged in the released state in the indentation and in the locked state fixed in the indentation by the mounting bracket, the base body having at least two differently designed indentations, provided for interlocking a respective part of two differently designed and modular interchangeable support rods.

8. A method for assembling a fastening arrangement for a headrest, the method comprising the steps of:
in a first assembly step a base body and a support rod are prepositioned relative to each other; and
in a second assembly step the base body and the support rod are fixed relative to each other, and in the second assembly step, a mounting bracket is pivoted around a pivot axis relative to the base body from a released state, in which the base body and the support rod are prepositioned relative to each other, into a locked state, in which the base body and the support rod are fixed to each other by the mounting bracket, the base body having at least one indentation provided for interlocking admission of at least a partial area of the support rod, wherein the support rod can be arranged in the released state in the indentation and in the locked state fixed in the indentation by the mounting bracket, the base body having at least two differently designed indentations, provided for interlocking a respective part of two differently designed and modular interchangeable support rods.

9. A method according to claim 8, wherein in the first assembly step, the support rod is pushed into a through-opening of the base body and/or at least a part of the support rod is arranged in a recess of the base body, wherein the mounting bracket remains in a free state in the first assembly step.

* * * * *